US012173642B1

(12) United States Patent
Kraus

(10) Patent No.: US 12,173,642 B1
(45) Date of Patent: Dec. 24, 2024

(54) FREE-PISTON LINEAR GENERATOR

(71) Applicant: Richard Kraus, New York, NY (US)

(72) Inventor: Richard Kraus, New York, NY (US)

( * ) Notice: Subject to any disclaimer, the term of this patent is extended or adjusted under 35 U.S.C. 154(b) by 0 days.

(21) Appl. No.: 18/370,184

(22) Filed: Sep. 19, 2023

Related U.S. Application Data

(63) Continuation of application No. 18/236,013, filed on Aug. 21, 2023, now abandoned.

(51) Int. Cl.
*F02B 63/04* (2006.01)
*F02B 71/06* (2006.01)
*F02B 75/40* (2006.01)

(52) U.S. Cl.
CPC ............ *F02B 63/041* (2013.01); *F02B 71/06* (2013.01); *F02B 75/40* (2013.01)

(58) Field of Classification Search
CPC ......... F02B 63/041; F02B 71/06; F02B 75/40
See application file for complete search history.

(56) References Cited

U.S. PATENT DOCUMENTS 2,362,151 A 11/1944 Ostenberg
7,431,474 B2 10/2008 Mah
8,729,717 B2 5/2014 Durrett et al.
10,815,878 B2 * 10/2020 Rainey .................. F01B 11/004
2013/0025570 A1 * 1/2013 Sturman ............... F02B 71/045 123/46 R

FOREIGN PATENT DOCUMENTS

CN 111206989 5/2020
CN 110529245 B 5/2021
WO 2007/035102 3/2007
WO 2017/109203 6/2017
WO WO-2020011790 A1 * 1/2020
WO WO-2022180629 A1 * 9/2022

OTHER PUBLICATIONS

Machine Translation of WO2022180629A1 Pdf File Name: “WO2022180629A1_Machine_Translation.pdf”.*
Machine Translation WO2020011790A1 Pdf File Name: “WO2020011790A1_Machine_Translation.pdf”.*

* cited by examiner

*Primary Examiner* — Lindsay M Low
*Assistant Examiner* — Ruben Picon-Feliciano
(74) *Attorney, Agent, or Firm* — Lawrence B. Goodwin, PLLC

(57) ABSTRACT

A free-piston linear generator wherein the piston is a magnet propelled into reciprocating motion inside a non-conducting cylinder around which is wrapped one or more induction coils. The magnet-piston may be propelled into motion using either internal combustion of a diesel aerosol in a two-stroke or 4-stroke configuration, with ignition provided by compression, or by steam pressure provided by an external boiler. Sensor-controlled exhaust, fuel-intake, and air-intake valves are located at either end of the cylinder, although only a single intake valve would be required in a steam version. As the magnet-piston moves in the cylinder, the power stroke on one side of the magnet-piston is the compression stroke on the other side. The movement of the magnet-piston induces an electric current in the induction coil, by which energy is drawn from the engine as useful work.

21 Claims, 4 Drawing Sheets

FIG. 1
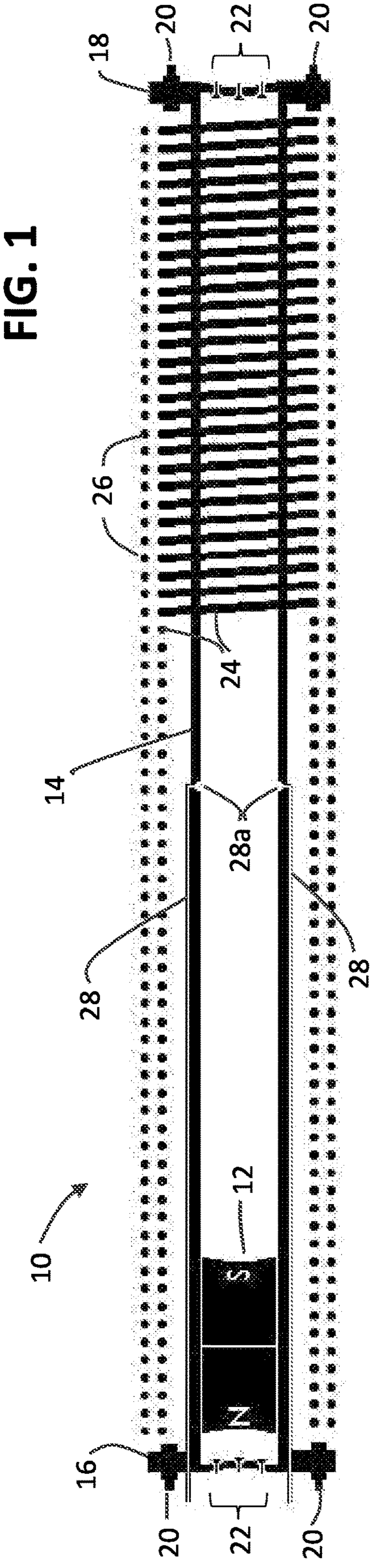
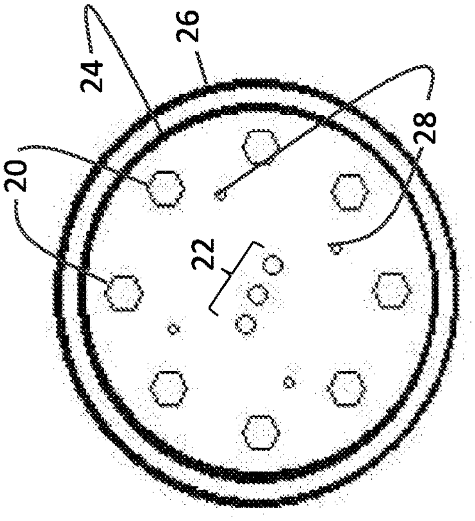
FIG. 2
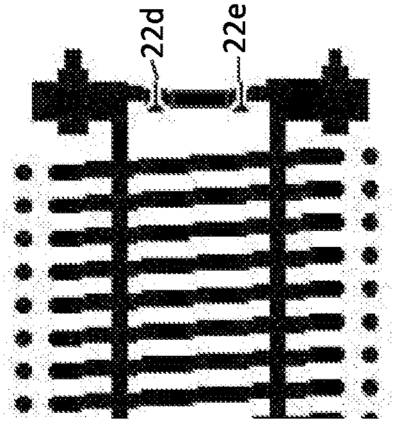
FIG. 1B
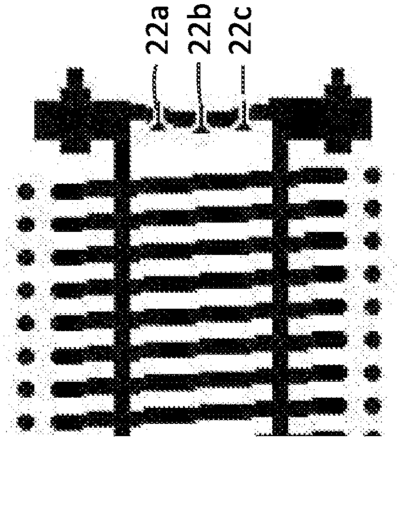
FIG. 1A
FIG. 1C
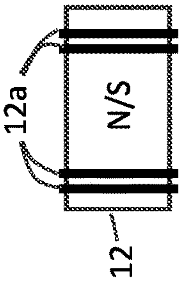

FREE-PISTON LINEAR GENERATOR

CROSS REFERENCE TO RELATED APPLICATION

This application is a continuation of U.S. patent application Ser. No. 18/236,013, filed Aug. 21, 2023, the entire disclosure of which is hereby incorporated by reference.

BACKGROUND OF THE INVENTION

1. Field of the Invention

The present invention relates to a free-piston linear generator (FPLG) in which a reciprocating piston is a magnet that transfers energy generated by combustion or steam to an induction coil or coils wrapped around the engine cylinder.

2. The Prior Art

In free-piston engines, power is not delivered to a crankshaft but is instead extracted through either exhaust gas pressure driving a turbine, through driving a linear load such as an air compressor for pneumatic power, or by incorporating a linear alternator directly into the pistons to produce electrical power. Free-piston linear generators typically use chemical energy from fuel to drive magnets through a stator and convert this linear motion into electric energy.

Several attempts have been made to design and produce a free-piston linear generator powered by internal combustion, examples of which are disclosed in U.S. Pat. No. 2,362,151A, WO 2007/035102 A1, WO 2017/109203 A1, DE102011117404B4, CN111206989B, and CN110529245B. All of these, however, require substantial mechanical complexity and have limited compression ratios in the engine, thereby limiting thermal efficiency.

SUMMARY OF THE INVENTION

The present invention is directed to a free-piston linear generator wherein the piston is a magnet propelled into reciprocating motion inside a non-conducting cylinder around which is wrapped one or more induction coils. The magnet-piston may be propelled into motion using either internal combustion of a diesel aerosol in a two-stroke or 4-stroke configuration, with ignition provided by compression, or by steam pressure provided by an external boiler. Sensor-controlled exhaust, fuel-intake, and air-intake valves are located at either end of the cylinder, although only a single intake valve would be required in a steam version. As the magnet-piston moves in the cylinder, the power stroke on one side of the magnet-piston is the compression stroke on the other side. The movement of the magnet-piston induces an electric current in the induction coil, by which energy is drawn from the engine as useful work. The flow of current through the coil is monitored by an ammeter, and the valves are actuated when the sinusoidal current flow approaches zero, which correlates with the end of travel of the magnet-piston. Sensor-controlled oil-injection ports are located at the center of the cylinder and are actuated when the current flow is at its maximum, which correlates with when the magnet piston is at the midpoint of the cylinder. Oil is thereby injected to lubricate the travel of the magnet-piston while minimizing the admixture of lubricating oil into the fuel-air mix during compression.

In accordance with an example of the present invention, a free piston linear induction generator comprises a first generator unit having at least one cylinder having an interior space and first and second ends, left and right end caps secured to the cylinder at the first and second ends, respectively, a single piston formed of a magnetic material disposed within the interior space of the cylinder, the piston dividing the interior space into a left interior space to the left of the piston, and a right interior space to the right of the piston, at least one conductive coil wound around the cylinder, input and exhaust valves on each of the left and right end caps, the valves controlled by a control unit, and an ammeter connected to the at least one conductive coil, the ammeter producing a current output indicative of a location of the piston within the cylinder, the valves controlled by the control unit based on the location of the piston, such that the piston moves in the cylinder in a reciprocating motion, from one end of the cylinder to the other, to thereby induce a current in the at least one conductive coil.

At least one oil-injection port is located in the cylinder and is adapted to inject lubricating oil into the cylinder based on the position of the piston within the cylinder. The oil-injection port is preferably located in the center of the cylinder, and the cylinder is preferably formed of stainless steel. The cylinder may be wrapped in a thin coating of an insulating material, which may be formed of silicone rubber. The left and right end caps may be curved inwardly toward the interior of the cylinder, and ends of the magnet may be correspondingly concave to accommodate the inwardly curved end caps. Preferably, the magnet is provided with rings to form a seal between the magnet and the cylinder, and the conductive coil may extend beyond the ends of the cylinder.

The magnet may be an Alnico magnet, and may be disposed in a housing with a cushioning layer made of a soft, insulating, non-magnetic material surrounded by a carbon steel shell. Alternatively, the piston may be made of carbon steel, and the at least one coil induces a magnetic field in the piston.

A valve-actuating coil may be fixed to each of the input and exhaust valves, and activated by the control unit to form an electromagnet, and the piston thereby acts to open and close the input and exhaust valves.

The generator of the present invention may be operated as an internal combustion generator, in which case the input and exhaust valves on each of the left and right end caps are comprised of fuel intake, air intake and exhaust valves. An inner conductive coil and an outer conductive coil are provided and preferably extend beyond the ends of the cylinder. The fuel intake valves are adapted to receive a combustible fuel, such that (i) when the right interior space is compressed as the magnet moves toward and approaches the right endcap, the exhaust valve in the left endcap opens, allowing exhaust in the left interior space to vent, the air intake valve in the left endcap opens to allow air into the left interior space, and the fuel is ignited in the right interior space thereby driving the piston toward the left endcap, and (ii) when the left interior space is compressed as the magnet moves toward and approaches the left endcap, the exhaust valve in the right endcap opens, allowing exhaust in the right interior space to vent, the air intake valve in the right endcap opens to allow air into the right interior space, and the fuel is ignited in the left interior space thereby driving the piston toward the right endcap. The generator would thus operate in a two-stroke cycle. The generator preferably includes a current source adapted to apply a current to one of the inner and outer conductive coils to thereby drive the piston toward one of the endcaps to compress and ignite fuel in one of the interior spaces, to thereby start the generator.

In accordance with another example of the present invention, a second generator unit, substantially identical to the first generator unit, is also provided, and first and second current sources are adapted to supply one of the inner and outer conductive coils in the respective first and second generator units, to thereby drive the pistons in the first and second generator units synchronously, such that the pistons run in tandem. When one of the first and second generator units is undergoing an intake/compression stroke, the other of the first and second generator units is undergoing a power/exhaust stroke, and when one of the first and second generator units is undergoing a power/compression stroke, the other of the first and second generator units is undergoing an intake/exhaust stroke, to thus operate in a four-stroke cycle.

In accordance with another example of the present invention, the generator the input valves are adapted to allow a source of steam to enter their respective interior spaces, and the exhaust valves are adapted to allow steam in their respective interior space to exit therefrom, to thereby run the generator as a steam-powered generator.

BRIEF DESCRIPTION OF THE DRAWINGS

These and other objects, aspects and examples of the present invention will be described with reference to the following drawing figures, of which:

FIG. 1 is a side, partial cross-section view of the generator of the present invention;

FIG. 1A is a detailed side-view of an end of the generator for the internal combustion version of the present invention;

FIG. 1B is a detailed side-view of an end of the generator for the steam-powered version of the present invention;

FIG. 1C is a side view of the magnet-piston used in accordance with the present invention;

FIG. 2 is an end view of the generator for the internal combustion version of the present invention;

DETAILED DESCRIPTION OF THE INVENTION

Figure 3:
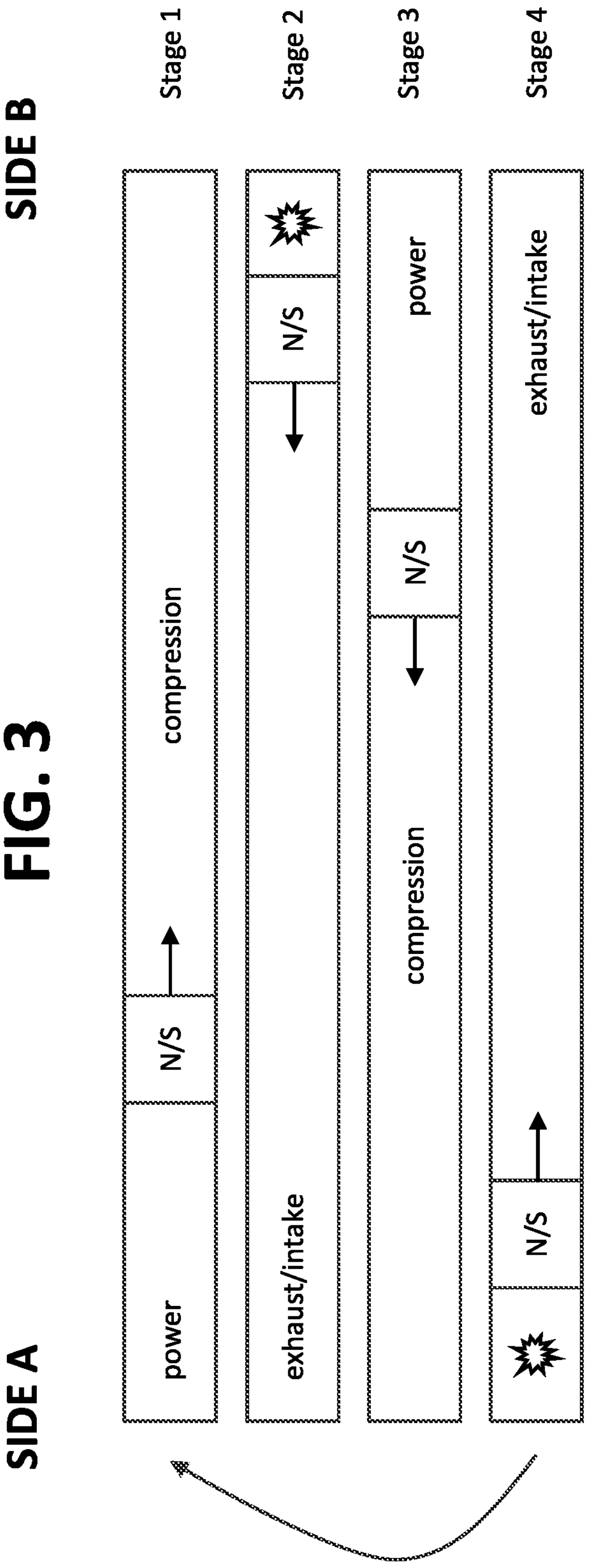
FIG. 3 is a diagram illustrating the operation of a 2-stroke embodiment of the internal combustion version of the present invention.

As shown in FIG. 1, and as will be described in greater detail below, the present invention is a free-piston linear generator 10 in which the piston 12 is itself a magnet. The magnet-piston 12 reciprocates within cylinder 14. End caps 16, 18 are secured on respective ends of cylinder 14 by bolts 20, as best shown in FIG. 2, and are provided with valves 22. A pair of induction coils 24, 26 are wrapped around the cylinder 14. (Coil 24 is shown in partial cross section, and coil 26 is shown in full cross section.) A plurality of oil lines 28 may be provided for lubricating the magnet-piston within the cylinder. The magnet-piston can be provided with piston rings as will be described.

The present invention can be operated as an internal combustion engine or a steam engine. In the internal-combustion version, and as shown in FIG. 1A, air intake valve 22*a*, fuel intake valve 22*b*, and exhaust valve 22*c* are provided in the end caps 16, 18. In the steam engine version, a steam intake valve 22*d* and an exhaust valve 22*e* are provided in the end caps.

The operation of the internal combustion version will be described with reference to FIGS. 3, 4 and 6. The internal combustion version can be operated as a 2-stroke or 4-stroke engine. The 2-stroke version will first be described.

FIG. 3 illustrates the sequence, or "stages" of the 2-stroke operation. In Stage 1, a diesel (although other fuels could theoretically be used, most compression engines use diesel) aerosol has been ignited by compression on Side A of the magnet-piston 12, propelling it toward the other end, Side B, of the cylinder 14, thereby compressing the air in that end of the cylinder. Compression ignition is preferred, since an accelerating magnetic field could potentially interfere with a sparkplug. In Stage 2, when the magnet-piston is near the end of its travel toward Side B, the exhaust valve 22*c* at Side A, which is now at or near its maximum volume, opens, allowing the exhaust to vent. At the same time, the fuel intake valve 22*b* at Side B, now the compressed side, opens, spraying a fine mist of diesel fuel into the compressed air, thereby igniting the fuel air mixture, as in a conventional diesel engine, while the exhaust valve 22*c* at Side A closes and the air intake valve 22*a* at that end opens, allowing air into that side. The burning fuel air mixture at Side B propels the magnet-piston back to Side A, as shown at Stage 3, the air intake valve 22*a* on Side A closes, and the process repeats at Stage 4. The engine thus operates like a typical two-stroke diesel engine, the difference being that there are combustion chambers on either side of the magnet-piston, each firing while the other is compressing, so that the engine is always undergoing a power stroke.

The accelerating magnetic field produced by the reciprocating motion of the magnet-piston 12 induces an alternating electrical current in the induction coils 24, 26, which are wrapped around the outside of the cylinder. The current can be applied to load 30, FIG. 6. Like alternating currents in general, it will vary as a sinusoidal wave, as shown in FIG. 7. This current can be monitored by an ammeter 32, FIG. 6, and when the magnet-piston 12 is at the end of its travel at either end of the cylinder, the amount of current produced will be at zero. A control unit 34, receiving input from the ammeter, will actuate the valves to trigger the next engine cycle at the appropriate times, as described above.

In order to maximize the energy captured, it is better, space and weight considerations permitting, to have multiple layers of induction coils around the cylinder. Maximizing the energy captured will also reduce electrical interference with other electronic devices in the vicinity. It is also better, space constraints permitting, to have the induction coils extend beyond the ends of the cylinder itself, since the magnetic field of the magnet-piston would also extend beyond the end-of-travel of the magnet-piston itself.

Figure 6:
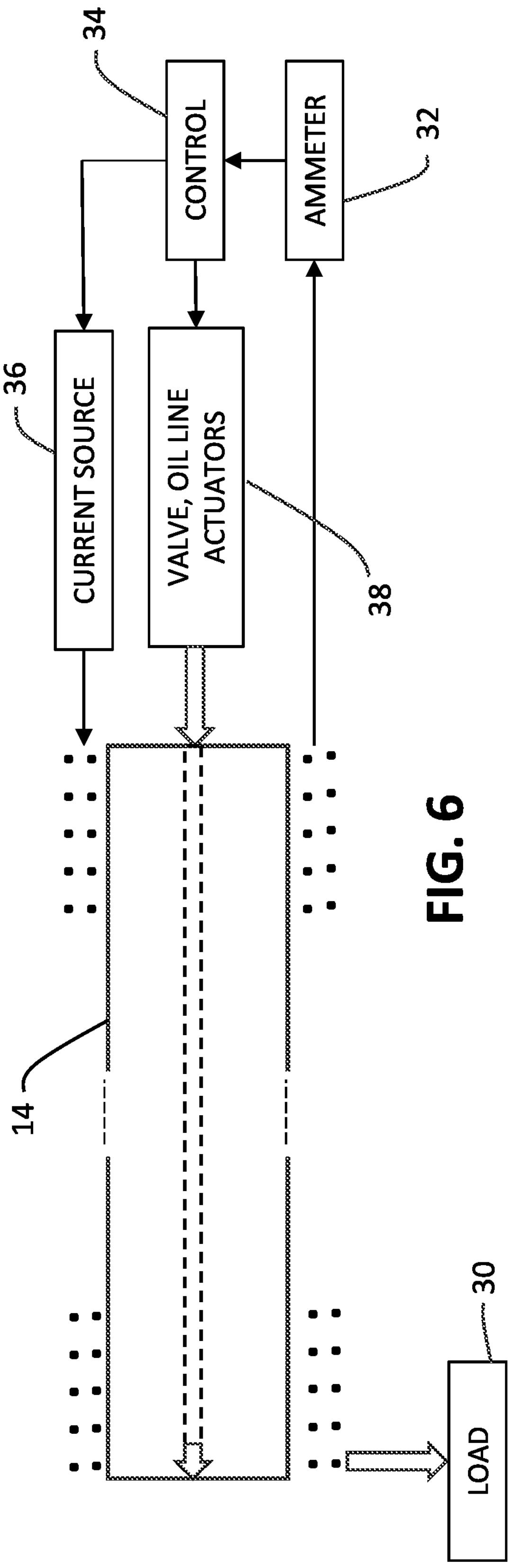
FIG. 6 is a diagram illustrating the sensor-controlled actuation of the valves, the current source for controlling the position of the magnet piston, and the load to be powered by the generator of the present invention.
Figure 7:
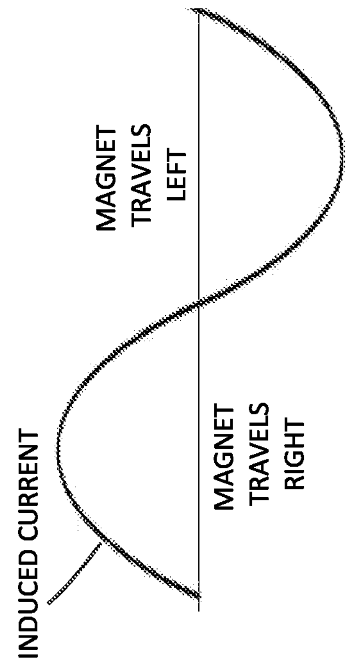
FIG. 7 illustrates the current induced in the coils during the magnet-piston's reciprocating motion inside the cylinder in accordance with the present invention.

Preferably, at least two coils are provided, one of which is adapted to actively move the magnet-piston within the cylinder, by applying a current from a source 36, FIG. 6, such as a battery or the like, to one of the coils. To start the engine, a current can be applied from the source 36 through one of the coils in order to induce motion in the magnet-piston, to thereby begin the first compression stroke, which would also induce a current through the second coil, which could then be monitored by the ammeter 32 in order to actuate the valves at the end of the first compression stroke, while also shutting off the current through the first induction coil after the first compression stroke. From that point, the engine would run normally.

Oil ports 28*a*, FIG. 1, at the center point of the cylinder, provide lubrication to the magnet-piston. The current will peak when the magnet-piston is in the center of the cylinder (the positive or negative peak of the sinusoid shown in FIG. 7) at which point, the control unit 34 can actuate an oil pump to spray the sides of the magnet-piston with oil as it passes through the center point of the cylinder. This will enable lubrication of the magnet-piston while minimizing the admixture of lubricating oil into the fuel-air mixture in the combustion chambers on either side of the magnet-piston, since the body of the magnet-piston itself will block the oil ports from the combustion chambers at that point. As shown in FIG. 1C, magnet-piston 12 can be provided with piston rings 12*a*, both to seal the combustion chamber and act as oil control rings. Although different configurations of piston rings are possible, the preferred configuration for most applications would be to have two at either end of the magnet-piston. The leading two would seal the combustion chamber while the trailing two would act as oil control rings; their roles would reverse when the magnet-piston reached the end of travel and reversed direction. The rings would have to be just wide enough not to expand into the indentation for the oil ports.

There are two major advantages to this system. First is its relative mechanical simplicity: the only moving parts in the generator are the valves and the magnet-piston itself. The bigger advantage, however, is that the cylinder can be arbitrarily long, which in turn means that the compression ratios can be arbitrarily large. Consequently, the thermal efficiency of the generator can potentially be extremely high. This is possible because energy is extracted through electrical induction instead of mechanically. Mechanical extraction of useful work, as in a conventional engine, would require more moving parts and would also create space constraints that would limit compression ratios.

A potential problem of the 2-stroke internal combustion generator is that, as with a typical two-stroke diesel engine, exhaust is accomplished by the remaining pressure in the chamber once the piston reaches top-dead center, since there is still a large pressure differential between the gas inside the combustion chamber and the surrounding air. However, as compression ratios rise, and thermal efficiency rises with them, the pressure differential between the waste gases inside the combustion chamber, when the piston reaches the end of its travel, and the surrounding air, goes to zero.

As such, when using the present invention, particularly with a long cylinder to maximize thermal efficiency, it may be preferable to utilize a 4-stroke cycle, with two (or a multiple thereof) substantially identical, separate generators 10, having functionally similar components, including the cylinder, endcaps, magnet-piston, coils, and valves, running side-by-side, adjacent to each other. The two separate generators may appropriately share, or have a separate, ammeter 30, control 34, current source 36 and actuators 38, under the control of control 34, which will be readily understood in view of the description herein.

The 4-stroke cycle will be described with reference to FIG. 4. In this configuration, it is preferable to have the magnet-pistons run in tandem, with each moving in the same direction and at the same location within their respective cylinders at any given time, as shown in FIG. 4, for example, and as described below, so that their magnetic fields do not interfere destructively with each other.

When using two cylinders or a multiple thereof in a 4-stroke configuration, it will be necessary to run a current through the innermost induction coil of any cylinder not undergoing a power stroke (in FIG. 4, the top cylinder in Strokes 1 and 4, and the bottom cylinder in Strokes 2 and 3, as will be described) so as to provide motive force to the magnet-piston in that cylinder, in a manner similar to that of engine start described above. The current induced in the outer induction coil will then be monitored by ammeter 32, FIG. 6, to monitor the position and velocity of travel of the magnet-piston in each cylinder, which would in turn allow the controller 34 to regulate the current through the innermost coil of the appropriate cylinder to keep both or all magnet-pistons moving in tandem. It is noted that although FIG. 6 shows only a single cylinder, it will be appreciated that the control system shown will be applied to both cylinders, the operation of which will be apparent in view of the description herein.

Figure 4:
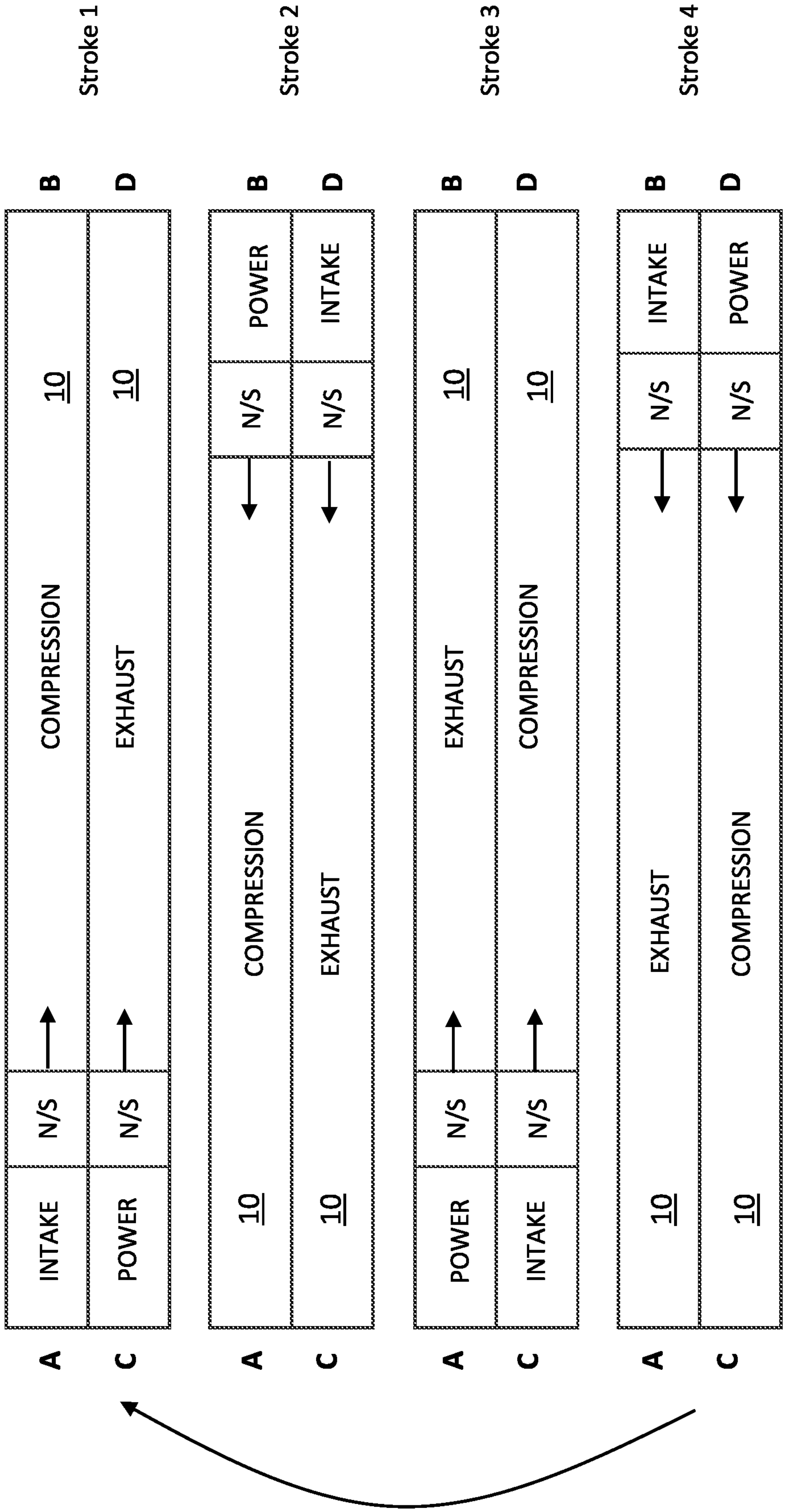
FIG. 4 is a diagram illustrating the operation of a 4-stroke embodiment of the internal combustion version of the present invention.

FIG. 4 illustrates the operational sequence of the 4-stroke configuration. Each stroke is represented by a pair of generators 10 positioned side-by-side as shown. Although not shown in FIG. 4, each of the generators includes all of the elements of FIG. 1, including the coils 24, 26 surrounding their respective cylinders. The order in the 4-stroke operation is 1) intake, 2) compression, 3) power, 4) exhaust. Intake and power are expansion strokes, and compression and exhaust are contraction strokes. With four strokes, at least four combustion chambers are required, so that there is always at least one chamber undergoing a power stroke, so as to power the other chambers. In this case, the current source 36 can be supplied from a portion of the current induced in the coils of the active generator.

In FIG. 4, the left-hand chamber of the top cylinder is labelled as chamber A, the right-hand chamber of the top cylinder is labelled as chamber B, the left-hand chamber of the bottom cylinder is labelled as chamber C, and the right-hand chamber of the bottom cylinder is labelled as chamber D. At any given time, each chamber needs to be undergoing a different stroke in the sequence, and when A and C are undergoing expansion strokes, B and D need to be undergoing contraction strokes, and vice versa. So, in Stroke 1, A is undergoing intake, B is undergoing compression, C is undergoing power, and D is undergoing exhaust. Then in Stroke 2, A undergoes compression, B undergoes power, C undergoes exhaust, and D undergoes intake. In Stroke 3, A undergoes power, B undergoes exhaust, C undergoes intake, and D undergoes compression. In Stroke 4, A undergoes exhaust, B undergoes intake, C undergoes compression, and D undergoes power, which brings the generators back to Stroke 1, and the sequence continues. Of course, Stroke 1 could be A-intake, B-exhaust, C-power, D-compression, in which case Stroke 2 would be A-compression, B-intake, C-exhaust, D-power; Stroke 3 would be A-power, B-compression, C-intake, D-exhaust; and Stroke 4 would be A-exhaust, B-power, C-compression, D-intake, then back to the beginning. (As practical matter, this is just switching the labels so that A becomes B, B becomes A, C becomes D, and D becomes C, and starting a step earlier.)

Figure 5:
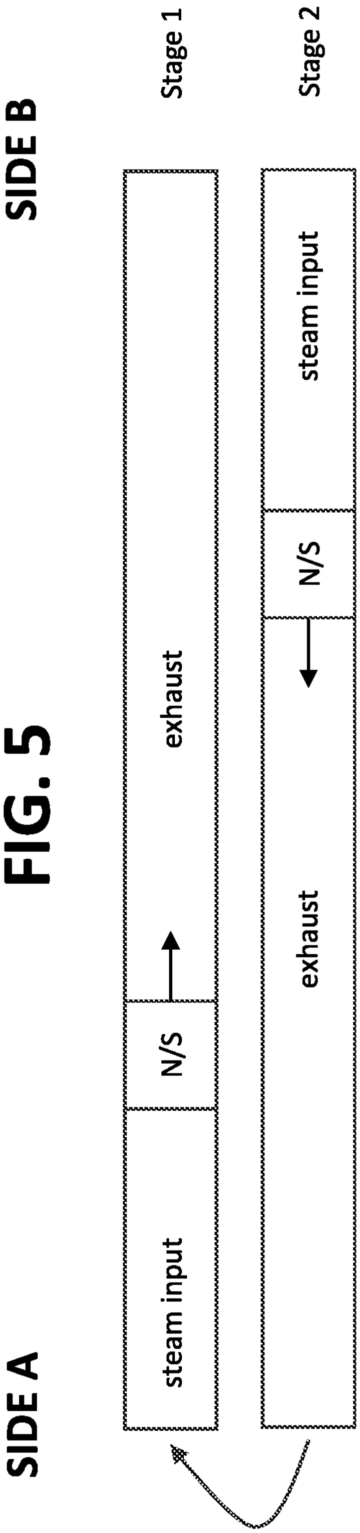
FIG. 5 is a diagram illustrating the operation of the steam-powered version of the present invention.

As an alternative to internal combustion, the present invention could also be used as a steam engine. In this configuration, only two valves, an intake valve 22*d* and an exhaust valve 22*e*, FIG. 1B, would be needed on ends of the cylinder. The intake valves would be connected to a separate boiler, and the power stroke for one chamber would be the exhaust stroke for the other, as shown in FIG. 5, providing an efficient 2-stroke operation. The steam engine embodiment would be controlled by the same control circuitry as shown in FIG. 6, except that current source 36 would not be necessary, as the steam itself would provide the necessary motive force.

In general, in all of the embodiments discussed above, the cylinder itself is preferably constructed of a material strong enough to withstand heat and pressure inherent in its operation, but it would also preferably be made of a material with low electrical conductivity, to thereby minimize energy loss due to inducing an electrical current in the cylinder, while also reducing the risk of sparking. For example, stainless steel would provide an acceptable mixture of strength, heat resistance, and low conductivity, while also not being too expensive.

Another possibility would be a ceramic material, and while there have been some experiments with ceramic engines, the problem with ceramics, while strong, heat-resistant, and with a high electrical resistivity, is that they tend to be brittle, thus limiting the ability of the cylinder to withstand the frequent pressure changes required. Another option might be a polymer, and there has been some work to develop a polymer engine, as in U.S. Pat. No. 4,726,334A. Polymers generally have very high electrical resistivity but may lack the required strength and heat resistance and can be combustible. Still another option would be a densified wood of the kind developed by a team led by Liangbing Hu at the University of Maryland. This material is reportedly of comparable strength to steel, while also having a high electrical resistivity without being brittle. It is, however, reportedly also prone to much greater thermal expansion than steel and may also be combustible. Nevertheless, ceramics, polymers, densified wood or other materials might also be suitable, especially as further advances are made in materials science and engineering. The ideal material would be high in strength, heat resistance, and electrical resistance, while low in brittleness. As presently understood, the material that best meets these criteria without being an experimental material for use in an engine would probably be stainless steel.

As shown in FIGS. 1 and 2, the cylinder 14 would need to be openable at least at one end, and possibly both, so that the magnet-piston can be placed inside and for periodic maintenance. The caps 16, 18 at the ends are preferably bolted to the cylinder using bolts 20, with a gasket used to ensure a tight seal. The caps, bolts, piston rings, engine valves and other such parts are preferably made of stainless steel, but other possible options for materials may be considered, as discussed above. The caps 16, 18 are preferably curved inwards, so as to maximize their ability to withstand the pressure in the combustion chamber; the faces of the magnet-piston are also preferably curved inwards to fit the caps.

Figure 8:
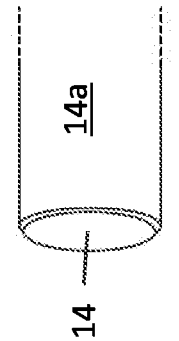
FIG. 8 illustrates a thin coating of an insulating material on the cylinder used in accordance with an example of the present invention.

Efficiency can be improved by wrapping the cylinder 14 in a thin coating of an insulating material 14*a*, as shown in FIG. 8, possibly silicone rubber, in order to prevent heat loss, both to further reduce waste heat, and to ensure that the conductivity of the induction coils is not reduced by higher temperatures. Such an insulator would not interfere with the magnetic field but, by raising temperatures inside the cylinder, might be a problem for the magnet-piston.

Figure 9:
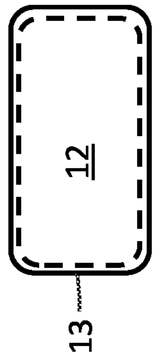
FIG. 9 illustrates the magnet-piston encased in a housing that provides a cushioning layer, in accordance with an example of the present invention.

Care should be taken to ensure that the magnet-piston does not lose its charge when exposed to heat or subject to impact, and to avoid breaking under physical stress. Alnico magnets, although not as strong magnetically as rare earth magnets, particularly neodymium, may be preferred, as they are more resistant to heat, are generally less brittle, and less expensive than rare earth magnets. As shown in FIG. 9, an alternative would be to encase the magnet 12 in a housing 13 with a cushioning layer made of a soft, insulating, non-magnetic material surrounded by a carbon steel shell, in which case the magnet would magnetize the carbon steel shell while being shielded from heat and impact. This would result in a weaker magnetic field, however, which would in turn reduce energy transfer to the induction coils.

Alternatively, the piston could be made of carbon steel. It would then be possible to turn the piston into an electromagnet by running a direct current through the innermost induction coil, thereby inducing a magnetic field in the piston. The engine would then function as before, with the gas-pressure-driven reciprocating motion of the magnet piston inducing an alternating current in the outer induction coils. The potential problems here are, first, that the movement of the electromagnet-piston would interfere with the direct current in the innermost induction coil, thereby interfering with the induced magnetic field, and second, that some of the energy generated by the engine would have to be used to power the electromagnet, reducing net energy production. Nevertheless, this would be an option in applications where the lifespan of the magnet was most essential.

Figure 10:
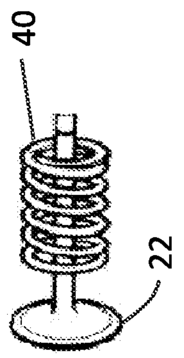
FIG. 10 illustrates a coil installed on, and fixed to, a valve-shaft in accordance with an example of the present invention.

Finally, the valves 22 can be standard solenoid-actuated valves, but a simpler expedient would be to use a coil 40 installed on, and fixed to, each valve-shaft, as shown in FIG. 10. When it is time to open that valve, a current can be applied to that coil, to form an electromagnet, so that the resulting magnetic field aligns with that of the magnet-piston 12, so that the magnet-piston will pull the valve open. By reversing the polarity, the magnet-piston will repel the valve-electromagnet and push the valve closed. Care should be taken to make sure that these electromagnets, which should be much less powerful than the magnet-piston in any case, are not interfering with or being interfered with by the magnet-piston 12. A potential problem with this arrangement might occur if the cylinder is long such that the magnet-piston may be too far away to push the intake valve closed at the end of the intake stroke or to pull the exhaust valve open at the beginning of the exhaust stroke. That should only be an issue in very long versions of the engine, since alnico magnets can be very powerful (the strongest can be as strong, or nearly as strong, as rare earth magnets, even neodymium magnets). A solution to this would be to increase the current through the electromagnet on the valve shaft effectively interact with the magnet-piston even when it is at the far end of its travel. The only issue is that alnico magnets can be prone to demagnetization through interaction with opposed magnetic fields. This is generally only an issue when the magnetic field is stronger than that of the magnet, which should not be close to being an issue here, but it is possible that even a weak opposed magnetic field could weaken the magnet-piston over time. The solution there is to increase the length of the magnet-piston 12 so that it is at least five times its diameter, since that will help protect against demagnetization. That means that in most applications, the bore diameter will have to be kept relatively low, so as to avoid having a magnet-piston that is so long that it takes up most of the cylinder, which would reduce the compression ratio, largely defeating the purpose of this design. That would mean lowering the total power output, but capturing more of that power as useful work should make up for it. For applications where higher power outputs are needed, a potential solution would be to use a shorter, wider magnet, possibly made of another material like neodymium, and simply accept the shorter lifespan of the magnet-piston as a tradeoff for increased power. Alternatively, power outputs could be increased by simply adding more cylinders, space permitting; in the four-stroke embodiment, any multiple of two would work.

While the foregoing is directed to exemplary embodiments of the present invention, other and further embodiments of the invention may be devised without departing from the basic scope thereof. The examples disclosed herein are for exemplary purposes only and should not be construed as limiting the present invention, which is defined in the following claims.

I claim:

1. A free piston linear induction generator comprising:

a first generator unit having a) at least one cylinder having an interior space and first and second ends;

b) left and right end caps secured to said cylinder at said first and second ends, respectively;

c) a single piston formed of a permanent magnet disposed within said interior space of said cylinder, said piston dividing said interior space into a left interior space to the left of said piston, and a right interior space to the right of said piston;

d) at least one conductive coil wound around said cylinder;

e) input and exhaust valves on each of said left and right end caps, said valves controlled by a control unit; and f) an ammeter connected to said at least one conductive coil, said ammeter producing a current output indicative of a location of said piston within said cylinder;

g) said valves controlled by said control unit based on said location of said piston, such that said piston moves in said cylinder in a reciprocating motion, from one end of said cylinder to the other, to thereby induce a current in said at least one conductive coil.

2. The free piston linear induction generator of claim 1 wherein at least one oil-injection port is located in said cylinder and is adapted to inject lubricating oil into said cylinder based on the position of said piston within said cylinder.

3. The free piston linear induction generator of claim 2 wherein said oil-injection port is located in the center of said cylinder.

4. The free piston linear induction generator of claim 2 wherein said permanent magnet is provided with rings to form a seal between said permanent magnet and said cylinder.

5. The free piston linear induction generator of claim 1 wherein said cylinder is formed of stainless steel.

6. The free piston linear induction generator of claim 1 wherein said cylinder is wrapped in a coating of an insulating material.

7. The free piston linear induction generator of claim 6 wherein said insulating material is formed of silicone rubber.

8. The free piston linear induction generator of claim 1 wherein said left and right end caps are curved inwardly toward the interior space of said cylinder, and ends of said permanent magnet are correspondingly concave to accommodate said inwardly curved end caps.

9. The free piston linear induction generator of claim 1 wherein said at least one conductive coil extends beyond the ends of said cylinder.

10. The free piston linear induction generator of claim 1 wherein said permanent magnet is an Alnico magnet.

11. The free piston linear induction generator of claim 1 wherein said permanent magnet is disposed in a housing with a cushioning layer made of an insulating, non-magnetic material surrounded by a carbon steel shell.

12. The free piston linear induction generator of claim 1 wherein a valve-actuating coil is fixed to each of said input and exhaust valves, said valve-actuating coils are activated by said control unit to form an electromagnet, and said piston thereby acts to open and close said input and exhaust valves.

13. The free piston linear induction generator of claim 1 wherein said generator is an internal combustion generator.

14. The free piston linear induction generator of claim 13, wherein said input and exhaust valves on each of said left and right end caps are comprised of fuel intake, air intake and exhaust valves.

15. The free piston linear induction generator of claim 14 wherein said at least one conductive coil wound around said cylinder comprises a plurality of coils, having at least an inner conductive coil and an outer conductive coil.

16. The free piston linear induction generator of claim 15 wherein said inner conductive coil and an outer conductive coil extend beyond the ends of said cylinder.

17. The free piston linear induction generator of claim 15 wherein said fuel intake valves are adapted to receive a combustible fuel, such that (i) when said right interior space is compressed as said permanent magnet moves toward and approaches said right endcap, said exhaust valve in said left endcap opens, allowing exhaust in said left interior space to vent, said air intake valve in said left endcap opens to allow air into said left interior space, and said fuel is ignited in said right interior space thereby driving said piston toward said left endcap, and (ii) when said left interior space is compressed as said permanent magnet moves toward and approaches said left endcap, said exhaust valve in said right endcap opens, allowing exhaust in said right interior space to vent, said air intake valve in said right endcap opens to allow air into said right interior space, and said fuel is ignited in said left interior space thereby driving said piston toward said right endcap.

18. The free piston linear induction generator of claim 15 further comprising a current source adapted to apply a current to one of said inner and outer conductive coils to thereby drive said piston toward one of said endcaps to compress and ignite fuel in one of said interior spaces, to thereby start said generator.

19. The free piston linear induction generator of claim 15 further comprising a second generator unit substantially identical to said first generator unit, and first and second current sources adapted to supply one of said inner and outer conductive coils in said respective first and second generator units, to thereby drive said pistons in said first and second generator units synchronously, such that said pistons run in tandem.

20. The free piston linear induction generator of claim 19 wherein when one of said first and second generator units is undergoing an intake/compression stroke, the other of said first and second generator units is undergoing a power/exhaust stroke, and when one of said first and second generator units is undergoing a power/compression stroke, the other of said first and second generator units is undergoing an intake/exhaust stroke.

21. The free piston linear induction generator of claim 1 wherein said input valves are adapted to allow a source of steam to enter their respective interior spaces, and said exhaust valves are adapted to allow steam in their respective interior spaces to exit therefrom.

* * * * *